(12) United States Patent
Alberson et al.

(10) Patent No.: US 6,729,607 B2
(45) Date of Patent: May 4, 2004

(54) CABLE RELEASE ANCHOR

(75) Inventors: Dean C. Alberson, Bryan, TX (US); D. Lance Bullard, Jr., College Station, TX (US); Roger P. Bligh, Bryan, TX (US); C. Eugene Buth, Wellborn, TX (US)

(73) Assignee: Texas A&M University System, College Station, TX (US)

( * ) Notice: Subject to any disclaimer, the term of this patent is extended or adjusted under 35 U.S.C. 154(b) by 0 days.

(21) Appl. No.: 10/199,452

(22) Filed: Jul. 19, 2002

(65) Prior Publication Data

US 2003/0015695 A1 Jan. 23, 2003

Related U.S. Application Data

(60) Provisional application No. 60/306,539, filed on Jul. 19, 2001.

(51) Int. Cl.⁷ ................................................. E01F 15/00
(52) U.S. Cl. .............................. 256/13.1; 403/2; 404/6; 52/98; 256/DIG. 5
(58) Field of Search ......................... 256/13.1, DIG. 5; 404/DIG. 6; 403/2; 52/98, 93.1; 248/900, 548; 40/607.04

(56) References Cited

U.S. PATENT DOCUMENTS

| | | | |
|---|---|---|---|
| 2,146,333 A | * | 2/1939 | Deming ...................... 403/231 |
| 4,490,062 A | * | 12/1984 | Chisholm ...................... 403/2 |
| 4,923,319 A | | 5/1990 | Dent |
| 5,078,366 A | | 1/1992 | Sicking et al. |
| 5,391,016 A | | 2/1995 | Ivey et al. |
| 5,407,298 A | | 4/1995 | Sicking et al. |
| 5,481,835 A | | 1/1996 | Bloom |
| 5,547,309 A | | 8/1996 | Mak et al. |
| 5,855,443 A | | 1/1999 | Faller et al. |
| 5,988,598 A | | 11/1999 | Sicking et al. |
| 6,065,894 A | * | 5/2000 | Wasson et al. ................. 403/2 |
| 6,254,063 B1 | | 7/2001 | Rohde et al. |
| 6,272,796 B1 | * | 8/2001 | Metzler ...................... 52/93.1 |
| 6,398,192 B1 | | 6/2002 | Albritton |
| 6,488,268 B1 | * | 12/2002 | Albritton .................... 256/13.1 |

FOREIGN PATENT DOCUMENTS

| | | |
|---|---|---|
| EP | 0924347 A1 | 6/1999 |
| WO | WO 96/20311 | 7/1996 |

* cited by examiner

*Primary Examiner*—Lynne H. Browne
*Assistant Examiner*—Jori Schiffman
(74) *Attorney, Agent, or Firm*—Madan, Mossman & Sriram, P.C.; Shawn Hunter

(57) ABSTRACT

A cable release anchor having an improved breakaway post design with a cable release feature. The cable release anchor includes upper and lower anchor portions that are readily separable from one another during an impact. A bearing plate is retained within the end of each of the upper and lower anchor portions, and each bearing plate has a bearing surface that is oriented at an acute angle with the vertical when installed in the ground. Each of these bearing plates contains a U-shaped cutout. When the upper and lower anchor portions are joined, the cutouts form an opening through which an end of the tension cable is disposed. An impact to the upper anchor portion readily releases the upper post section from the lower post section and frees the cable. The cable release anchor provides positive anchorage to react to tensile loads on a rail member to redirect a vehicle impacting along the length of the terminal or guardrail.

20 Claims, 5 Drawing Sheets

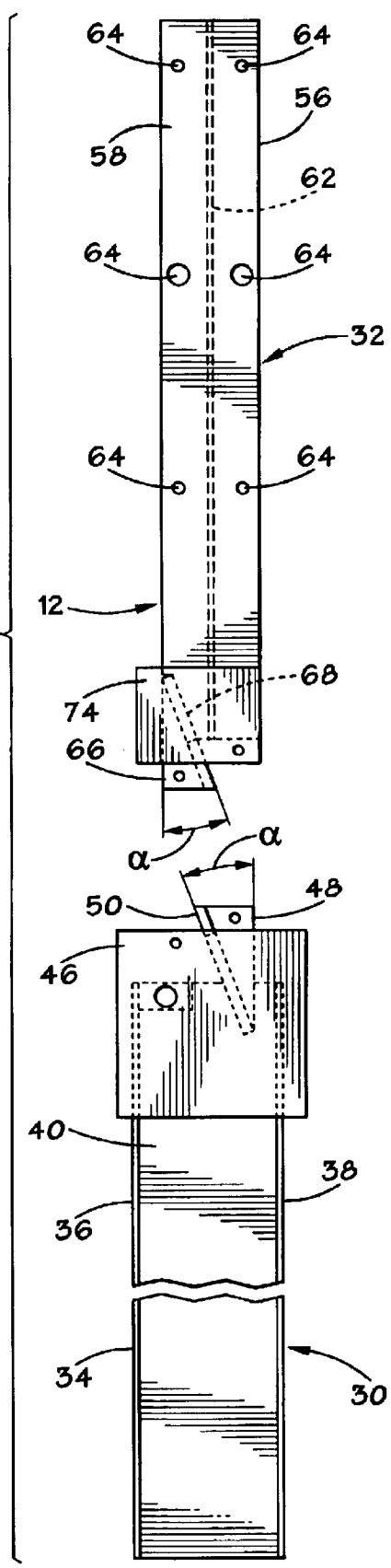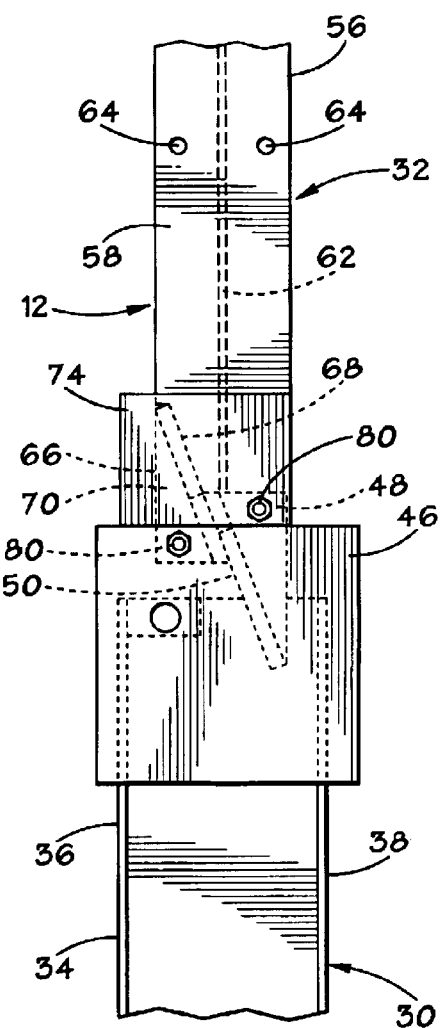

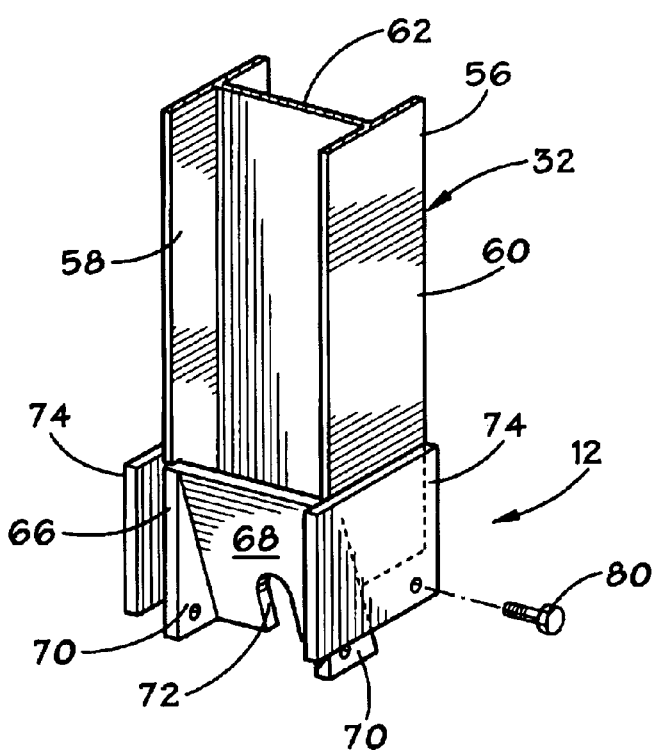
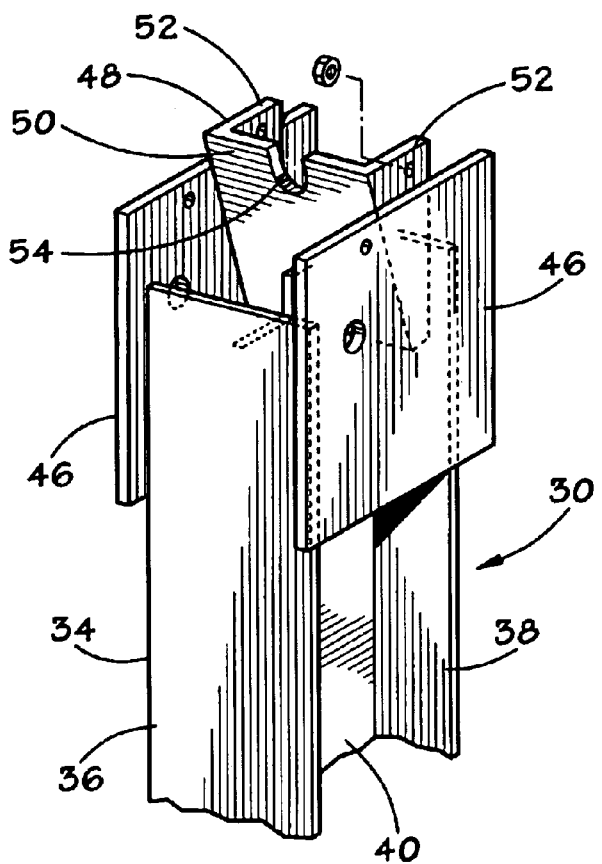
FIG. 6

CABLE RELEASE ANCHOR

CROSS-REFERENCE TO RELATED APPLICATIONS

This application claims the priority of provisional patent application Ser. No. 60/306,539 filed Jul. 19, 2001.

BACKGROUND OF THE INVENTION

1. Field of the Invention

The invention relates generally to the design of breakaway posts for guardrail terminals and the like. More particularly, the invention relates to steel breakaway post design. In particular aspects, the invention relates to devices and methods for releasing a guardrail tension cable during a collision.

2. Description of the Related Art

A guardrail installation should be installed along a roadside or median such that its upstream end, or the end of the guardrail installation facing the flow of traffic, does not in itself form a hazard. As used herein, the term "upstream" refers to the direction from which an impacting vehicle would be expected to approach. The term "downstream" refers to the opposite direction, i.e., the direction toward which an impacting vehicle would be expected to travel.

Many of the current generation of NCHRP Report 350-compliant guardrail terminals use wooden breakaway posts within the terminal section. The two most upstream end posts are typically wooden breakaway cable terminal (BCT) posts that are inserted into steel foundation tubes and sometimes joined with a ground strut to provide additional anchorage. The furthest upstream wooden breakaway post serves the dual function of supporting the rail element and securing one end of a tension cable proximate the ground line. Examples of this type of cable anchorage arrangement maybe seen in U.S. Pat. No. 5,547,309 issued to Mak et al.; U.S. Pat. No. 5,078,366 issued to Sicking et al.; U.S. Pat. No. 5,407,298 issued to Sicking et al.; and U.S. Pat. No. 5,391,016 issued to Ivey et al. Each of these arrangements disposes one end of the tension cable through a drilled hole in the lower portion of the wooden post. Wood has been used for breakaway posts because it is readily available and inexpensive. However, wood also has many drawbacks. For example, there are wide variations in the quality of the wood used, and thus the associated force necessary to break the post away varies. Also, the strength of a wooden post is affected by many factors including post size, ring density, location and size of knots and cracks, species and moisture content.

The ability of lead posts to break away is important to minimize the potential for vehicle ramping and excessive decelerations to vehicles during end-on impacts. When wooden posts are used, the ability to break the post away is enhanced by drilling holes through the post proximate to ground level, thereby reducing the force required to break the post away during an impact. This practice exposes the untreated interior of the post making it more prone to deterioration from environmental factors such as moisture, heat and freeze and thaw cycles. Additionally, wooden posts disposed in foundation tubes can sometimes be difficult to remove from the ground after impact due to swelling of the wood. Broken wooden posts are considered to be an environmental hazard due to the presence of chemical preservatives used in the wood to control decay. Proper disposal of such accident debris is becoming a significant problem.

In an effort to address some of the shortcomings of wooden breakaway posts, a number of steel breakaway post designs have been developed. Such post designs are described, for example, in U.S. Pat. Nos. 5,988,598 and 6,254,063. In general, however, these posts have not received wide spread acceptance due to maintenance problems and a high initial cost. There is, therefore, a need to develop steel breakaway posts that can be used as an alternative to wooden breakaway posts in guardrail terminals and other applications.

Additionally, wire rope safety rail systems have recently been developed that require separate anchorages for multiple horizontally-disposed tension cables. Thus, there is an even greater need for a cost-effective steel breakaway post design that provides an effective means of anchoring a tension cable and selectively releasing it.

Slip splice connections have been used for support posts for traffic signs and light poles. To the inventors' knowledge, however, they have not heretofore been used successfully for support of portions of guardrail installations. Additionally, prior art slip splice connections have relied upon posts having horizontal upper and lower slip, splice plates that are held together by a plurality of bolts. During an impact to the upper portion of the post, the slip splice is activated to disconnect the upper portion of the post from the lower portion by causing relative horizontal movement of the upper post portion with respect to the lower post portion. Examples of such slip splice connections are described, for example, in U.S. Pat. No. 5,481,835 issued to Bloom; U.S. Pat. No. 4,923,319 issued to Dent; and U.S. Pat. No. 5,855,443 issued to Faller et al. These slip splice connections are not suitable breakaway arrangements for use in guardrail installations. With a guardrail support post, as opposed to, say, a light pole or traffic sign support, the center of mass and rotation is located much lower. Additionally, the overall masses of the traffic sign and light pole are significantly greater than that of the guardrail support post. As a result, the slip splice connection point on a guardrail support post is subjected to greater moment forces than translational forces and inertial forces. The lower end of the guardrail support post will, therefore, not "kick out" to the degree that the lower end of a sign support or light pole would. Thus, disconnection of the guardrail support post is much more uncertain.

An effective steel breakaway post would provide a number of advantages over wooden posts. Steel is a homogenous material with known characteristics that can be controlled. Thus, the strength and forces required to break the post away can be controlled and will provide better and more consistent safety performance for roadside devices. Steel is also more resistant to deterioration than wood in field applications and can be recycled to eliminate disposal problems. A well-designed breakaway steel post can be more economically installed by drivers as opposed to the drilling and backfilling required to install wooden posts. Further, breakaway steel posts would provide a more uniform appearance when terminals are attached to steel post guardrail systems.

The present invention addresses problems of the prior art.

SUMMARY OF THE INVENTION

The invention provides a cable release anchor having an improved breakaway post design with a cable release feature. In a preferred embodiment, the cable release anchor is fashioned of steel and used as the furthest upstream post in a guardrail terminal. The cable release anchor includes upper and lower anchor portions that are readily separable from one another during an impact. A bearing plate is retained within the end of each of the upper and lower anchor portions, and each bearing plate has a bearing surface that is oriented at an acute angle with the vertical when installed in the ground. Each of these bearing plates contains a U-shaped cutout. When the upper and lower anchor portions are joined, the cutouts form an opening through which an end of the tension cable is disposed. An impact to the upper anchor portion readily releases the upper post section from the lower post section and frees the cable.

The design of the present invention is advantageous in that it permits the upper anchor portion to present a different and smaller cross-section than that of the lower anchor portion. Thus, stronger anchorage for the release anchor is provided while still allowing the device to be driven into the ground using standard driving equipment.

End-on impacts to the guardrail installation will strike the upper anchor portion upon its weak axis. Disconnection of the splice connection of the upper and lower post sections then occurs without the binding that might tend to occur with a slip splice connection. When the length of the guardrail terminal is impacted, the angled bearing plates incorporated into the post provide positive anchorage for the guardrail for redirecting the impacting vehicle.

BRIEF DESCRIPTION OF THE DRAWINGS

FIG. 2 is a side view of the exemplary cable release anchor showing the upper and lower portions separated.

FIG. 3 is a side view of the exemplary cable release anchor showing the upper and lower portions interconnected.

FIG. 6 is an isometric view of the exemplary cable release anchor showing the upper and lower portions separated.

DETAILED DESCRIPTION OF THE PREFERRED EMBODIMENTS

Figure 1:
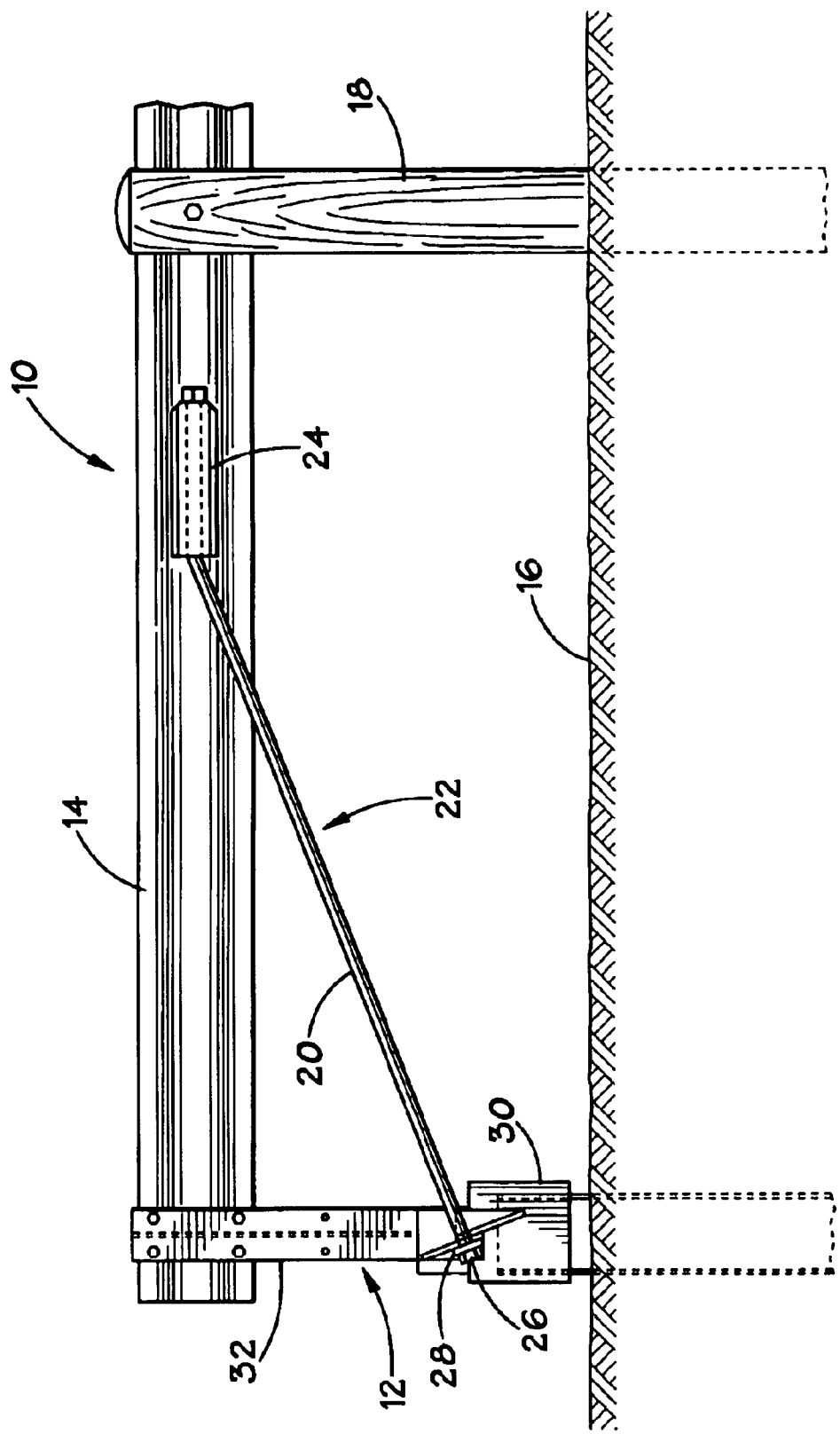
FIG. 1 is a side view depicting an exemplary cable release anchor constructed in accordance with the present invention.
Figure 4:
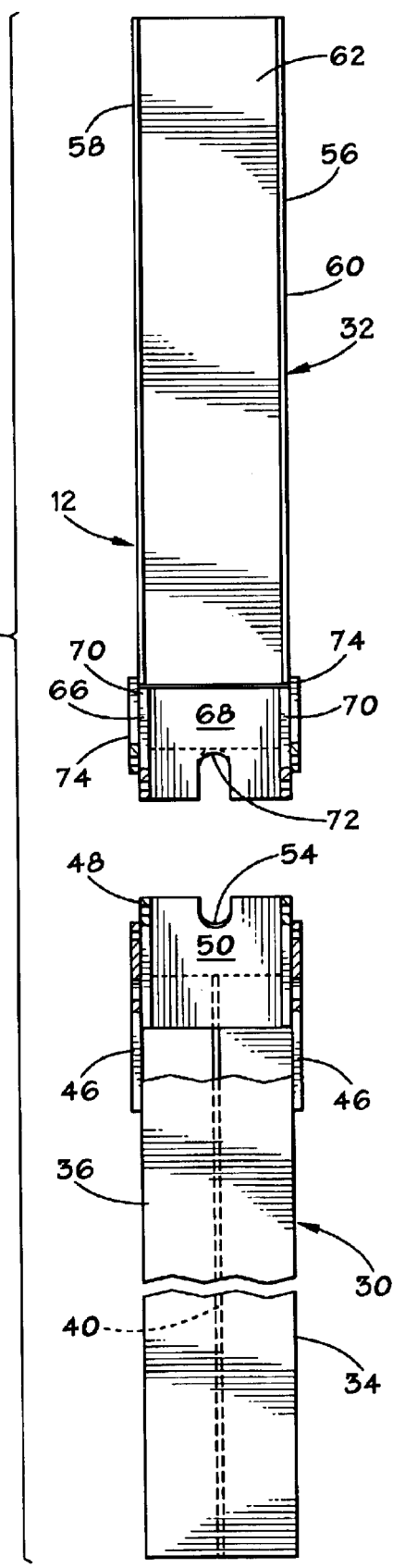
FIG. 4 is a front view of the exemplary cable release anchor showing the upper and lower portions separated.
Figure 5:
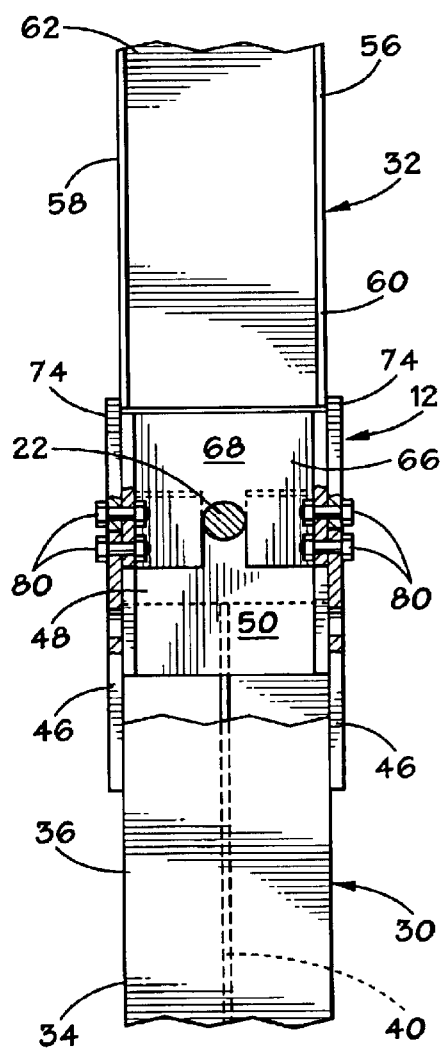
FIG. 5 is front view of the exemplary cable release anchor showing the upper and lower portions interconnected.

Referring first to FIG. 1, there is shown the upstream end of an exemplary roadway guardrail installation 10 incorporating a cable release anchor 12 that is constructed in accordance with the present invention. The guardrail installation 10 includes a horizontally disposed corrugated (or "W-beam") rail member 14 of a type known in the art. The rail member 14 is supported above the ground 16 by a plurality of wooden support posts 18 (one shown) along its length. Although only the upstream end of the installation is shown, it will be understood that a number of such support posts are required to maintain the rail member 14 above the ground 16.

A tension cable assembly 20 is used to help anchor the upstream end of the installation 10. The tension cable assembly 20 includes a tension cable 22 that is secured to the rail member 14 by securing plate 24 at one of its ends. At its other end the tension cable 22 is releasably secured to the cable release anchor 12 such that when the cable release anchor 12 is struck by an impacting vehicle (not shown), the cable 22 will be released from the cable release anchor 12. The cable 22 is provided with a threaded, lower distal end 26 that is fitted with a nut 28. The cable release anchor 12 provides positive anchorage to react to tensile loads on the rail member 14 to redirect a vehicle impacting laterally along the length of the rail member 14.

The structure and operation of the cable release anchor 12 may be more fully appreciated by reference to FIG. 2 through FIG. 7. The anchor 12 includes a lower anchor portion 30 to be buried within the ground 16, and an upper anchor portion 32 that is secured to the rail member 14.

The lower anchor portion 30 includes a longitudinal beam member 34 of an I-beam configuration wherein there are a pair of flanges 36, 38 interconnected by a central web 40. In a currently preferred embodiment, the beam member 34 comprises a W 6×15 steel post member. The upper end of the web 40 contains a cutout section 42 and an angled slot 44, both of which are, visible in FIG. 7. A pair of rectangular side plates 46 are affixed to opposite sides of the beam member 34. Preferably, the side plates 46 are secured by welding to each of flanges 36, 38.

Figure 7:
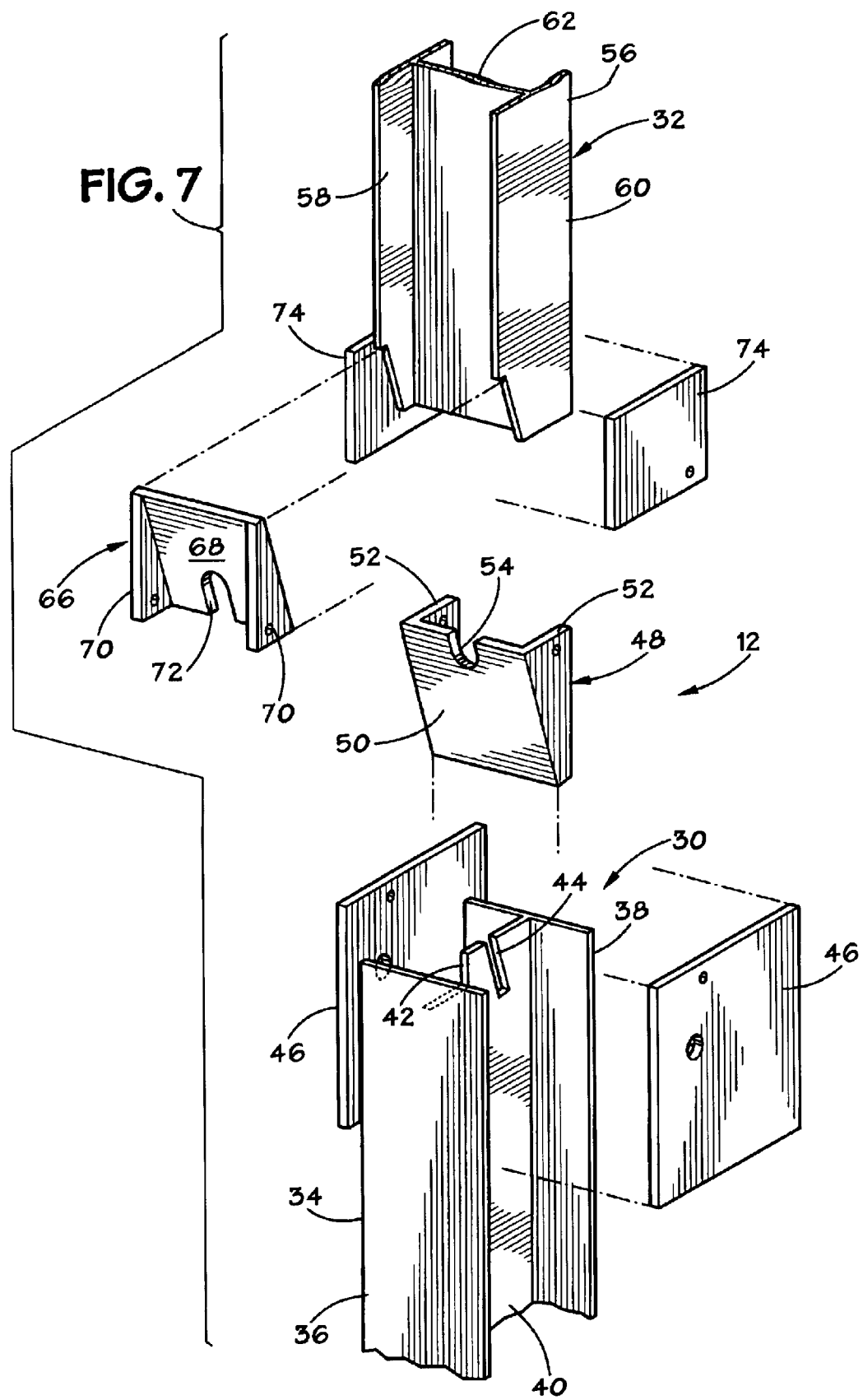
FIG. 7 is an exploded isometric view of the exemplary cable release anchor.

A lower bearing plate member 48 is secured within the angled slot 44 of the beam member 34. The lower bearing plate member 48, as best shown in FIGS. 6 and 7, includes a rectangular central plate 50 having two generally triangular wing portions 52. A U-shaped cut-out 54 is present in the center of the upper side of the central plate 50. The lower bearing plate member 48 is preferably a unitarily formed piece that is secured by welding to the beam member 34 and each side plate 46. The side plates 46 lend strength and stability to the lower anchor portion 30.

The upper anchor portion 32 is similar in many respects to the lower anchor portion 30. The upper anchor portion 32 includes a longitudinal beam member 56 that, like the beam member 34, has an "I-beam" configuration with two flanges 58, 60 joined by web 62. However, the beam member 56 of the upper anchor portion 32 presents a smaller side cross-section than the beam member 34 of the lower portion. More specifically, the flanges 58, 60 of the upper beam member 56 have a width that is less than the width of the web 40 for the lower beam member 34 (see FIGS. 2 and 3). It is particularly preferred that the beam member 56 comprise a W 6×9 steel I-beam. Each of the flanges 58, 60 contain apertures 64 placed at intervals along their length (see FIGS. 2 and 3). The apertures 64 permit fasteners to be passed through a flange 58 or 60 to secure the upper anchor portion 32 to a rail member, if desired. An upper bearing plate member 66 is secured to the lower end of the beam member 56, preferably by welding. The upper bearing plate member 66, like the lower bearing plate member 48, includes a rectangular central plate portion 68 and two generally triangular side plate portions 70. The central plate portion 68 includes a U-shaped cutout 72. A pair of rectangular side plates 74 are securely affixed to opposite sides of the beam member 56. In the case of the upper anchor portion 32, each of the side plates 74 are welded to one of the flanges 58 or 60, respectively.

The upper and lower anchor portions 30, 32 are assembled so as to be reversably interconnected to one another in an end-to-end fashion and as well to anchor the cable 22. When the two anchor portions 30, 32 are assembled, the lower end of the upper anchor portion 32 is aligned with the upper end of the lower anchor portion 30 so that the two central plate portions 50, 68 of the bearing plate members 48, 66 are placed in adjoining contact (see FIGS. 3 and 5). The U-shaped cut-outs 54, 72 are aligned with one another so that a single opening is formed to retain cable 22 there within (see FIGS. 1 and 5). The presence of nut 28 prevents withdrawal of the cable 22 from the opening formed by the two U-shaped cutouts 54, 72. When the upper and lower anchor portions 30, 32 are assembled in this manner, the assembly is then secured using fasteners 80, which are visible in FIGS. 3, 5, and 6. In a currently preferred embodiment, the fasteners 80 comprise ⅜ inch assembly bolts with matching nuts. Two of the fasteners 80 are disposed through the side plates 74 of the upper anchor portion 32 and the wing portions 52 of the lower anchor portion 30, thus fastening the upper and lower portions 30, 32 together. Two other fasteners 80 are disposed through the side plates 46 of the lower anchor portion 30 and the wing portions 70 of the upper post portion 32. This placement of fasteners 80 also secures the upper and lower anchor portions 30, 32 together to form a cable release anchor 12. It is noted that, when the cable release anchor 12 is fully assembled, the two central plate portions 50, 68 of the bearing plate members 48, 66 are oriented to form an acute angle α (see FIG. 2) with the longitudinal axes of their respective beam members 34, 56. When installed within the ground 16, the plate portions 50, 68 are oriented at an acute angle α with the vertical. In a currently preferred embodiment, this angle a is approximately 20 degrees.

In use, the cable release anchor 12 secures one end of the tension cable 22 as shown in FIG. 1. The anchor 12 may also be used as an upstream support for the rail member 14, although the support of such a rail member is not necessary.

During an end-on impact to the cable release anchor 12 by an impacting vehicle (not shown), the vehicle will strike the upper anchor portion 32 at a point somewhat above the interconnection of the upper and lower anchor portions 30, 32. A moment of force is imparted to the upper portion 32. The fasteners 80, which are relatively weak, are destroyed by shearing, thus freeing the upper anchor portion 32 from the lower anchor portion 30. In practice, the fasteners are easily sheared by lateral movement of the side plates 74 or 46 with respect to the wing portions 52 or 70. After shearing of the fasteners, the upper anchor portion 32 is then generally moved away from the lower anchor portion 30 by the impacting vehicle. As this disconnection of the upper and lower portions 30, 32 occurs, the cable 22 is freed from the opening formed by the U-shaped cut-outs 54, 72, thereby assisting in the controlled end-on collapse of the guardrail installation 10 by the impacting vehicle. The orientation of the central bearing plates 50, 68 at an acute angle to the vertical materially assists the ability of the upper and lower anchor portions 30, 32 to become disconnected from one another during a vehicular impact. Force imparted to upper portions of the upper anchor portion 32 induces moment about the connection point where the bearing plates 50, 68 are in contact with one another. The upper and lower portions 30, 32 become disconnected from one another as the upper bearing plate 68 rotates partway and then moves in a downstream direction over and away from the lower bearing plate 50. In practice, this type of disconnection is more reliable than one would have with a standard slip splice connection. In the slip splice connection, the bearing plates would be oriented substantially horizontally and held together with connectors. During impact, a proper disconnection would depend upon lateral movement of one bearing plate with respect to the other. Such movement is inhibited by frictional forces, the presence of connectors and unwanted moment forces that may cause the slip splice connection to bind up rather than releasing properly. Because the bearing plates 50, 68 of the cable release anchor 12 do not need to be moved laterally with respect to one another in order to be disconnected, release is more certain.

It is noted that, when the cable release anchor 12 is assembled, the orientation of the beam members 34, 56 in the upper and lower anchor portions 30, 32 is different. The web 40 of the lower beam member 34 is oriented to be parallel with the flanges 58, 60 of the upper beam member 56 when the cable release anchor 12 is assembled. In addition, as noted above, the upper and lower beam members 34, 56 are preferably of different cross-sectional sizes with the upper beam member 56 being of smaller cross-sectional size than the lower beam member 34. As explained, it is preferred that the upper beam member 56 be a W 6×9 steel I-beam. This a standard size I-beam that might be used as a support post in a standard guardrail installation along a roadway. Hence, the upper beam member 56 can be readily engaged by a driver mechanism, of a type known in the art, for driving an I-beam post into the ground. Thus, the advantage to use of the W9×6 size cross-section for the upper beam member 56 is that the cable release anchor 12 may be installed using a standard driver device. Further, the use of a beam member of larger cross-section and different orientation for the lower beam member 34 provides improved ground anchorage for the cable release anchor 12.

FIG. 1 illustrates a proper in-ground installation of the cable release anchor 12. When so installed, the front and rear edges of the flanges 58, 60 of the upper anchor portion 32 are presented in upstream and downstream directions, respectively.

The cable release anchor 12 of the present invention has application in a wide variety of guardrail installations, including standard corrugated W-beam type guardrails and thrie-beam guardrail terminals wherein a tension cable must be anchored at an upstream post. In addition, the invention has applicability to cable guardrail terminal arrangements wherein multiple tension cables must be anchored.

Guardrail installations that incorporate the inventive cable release anchor have been shown to have a performance advantage over other standard breakaway post models. The cable release anchor results in less rotation of the post and more consistent release of the tension cable during impact. Further, there is a more positive anchorage that is reactive to tensile loads produced in the rail elements.

Those of skill in the art will recognize that numerous modifications and changes may be made to the exemplary designs and embodiments described herein and that the invention is limited only by the claims that follow and any equivalents thereof.

What is claimed is:

1. A cable release anchor comprising:
    a first anchor portion to be partially buried in the ground, the first anchor portion comprising:
        a longitudinal first beam member having a longitudinal axis;
        a first bearing plate affixed to an end of the first beam member and presenting a first bearing surface forming an acute angle with the longitudinal axis of the first beam member;
    a second anchor portion being separably interconnected with the first anchor portion, the second anchor portion comprising:
        a longitudinal second beam member having a longitudinal axis; and
        a second bearing plate affixed to an end of the second beam member and presenting a second bearing surface forming an acute angle with the longitudinal axis of the second beam member,
    the second bearing surface of the second bearing plate abutting the first bearing surface of the first bearing plate when the second anchor portion is interconnected with the first anchor portion.

2. The cable release anchor of claim 1 wherein the first and second bearing plates each include a cut-out portion, the cut-out portions being aligned when the first and second anchor portions are interconnected so that a cable may be retained between the cut-out portions.

3. The cable release anchor of claim 1 further comprising at least one fastener for releasably securing the first and second anchor portions together.

4. The cable release anchor of claim 1 wherein the acute angle is approximately 20 degrees.

5. The cable release anchor of claim 1 wherein the first and second beam members comprise metal I-beams.

6. The cable release anchor of claim 5 wherein the first beam members comprises a W 6"×15" beam member.

7. The cable release anchor of claim 5 wherein the second beam member comprises a W 6"×9" beam member.

8. The cable release anchor of claim 1 wherein the first and second beam members are of unequal cross-sectional sizes.

9. A cable release anchor comprising:
   a first anchor portion to be partially buried in the ground, the first anchor portion comprising:
     a longitudinal first beam member having a longitudinal axis and being formed of a metal I-beam member;
     a first bearing plate affixed to an end of the first beam member and presenting a first bearing surface that forms an acute angle with the longitudinal axis of the first beam member;
   a second anchor portion being separably interconnected with the first anchor portion, the second anchor portion comprising:
     a longitudinal second beam member having a longitudinal axis and being formed of a metal I-beam member; and
     a second bearing plate affixed to an end of the second beam member and presenting a second bearing surface that forms an acute angle with the longitudinal axis of the second beam member, the second bearing surface abutting the first bearing surface when the second anchor portion is interconnected with the first anchor portion.

10. The cable release anchor of claim 9 wherein the first and second beam members are of unequal cross-sectional sizes.

11. The cable release anchor of claim 9 wherein the first beam member is cross-sectionally larger than the second beam member.

12. The cable release anchor of claim 9 wherein the first and second bearing plates each include a cut-out portion, the cut-out portions being aligned when the first and second anchor portions are interconnected so that a cable may be retained between the cut-out portions.

13. The cable release anchor of claim 9 wherein the acute angle is approximately 20 degrees.

14. The cable release anchor of claim 9 further comprising at least one shearable fastener for releasably securing the first and second anchor portions together.

15. A cable release terminal comprising:
   a first anchor portion to be partially buried in the ground, the first anchor portion comprising:
     a longitudinal first beam member having a longitudinal axis and being formed of an I-beam member having a pair of parallel flanges interconnected with a web;
   a second anchor portion being separably interconnected with the first anchor portion, in an end-to-end relation, the second anchor portion comprising:
     a longitudinal second beam member having a longitudinal axis and being formed of an I-beam member having a pair of parallel flanges interconnected with a web; and
     the second beam member being oriented so that the web of the first beam member is oriented to be normal to the web of the second beam member.

16. The cable release terminal of claim 15 further comprising:
   a first bearing plate secured to the first beam member;
   a second bearing plate secured to the second beam member; and
   the first and second bearing plates each forming an acute angle with the axis of the respective beam members.

17. The cable release terminal of claim 16 wherein the acute angle is approximately 20 degrees.

18. The cable release terminal of claim 16 wherein the bearing plates form an opening for selective securing of a tension cable.

19. The cable release terminal of claim 15 further comprising at least one connector for securing the first and second anchor portions together.

20. The cable release terminal of claim 15 further including a pair of side plates secured to each of the beam members.

* * * * *